BROWN & BARTLETT.
Grain and Grass Harvester.
No. 1,282. Reissued Feb. 25, 1862.
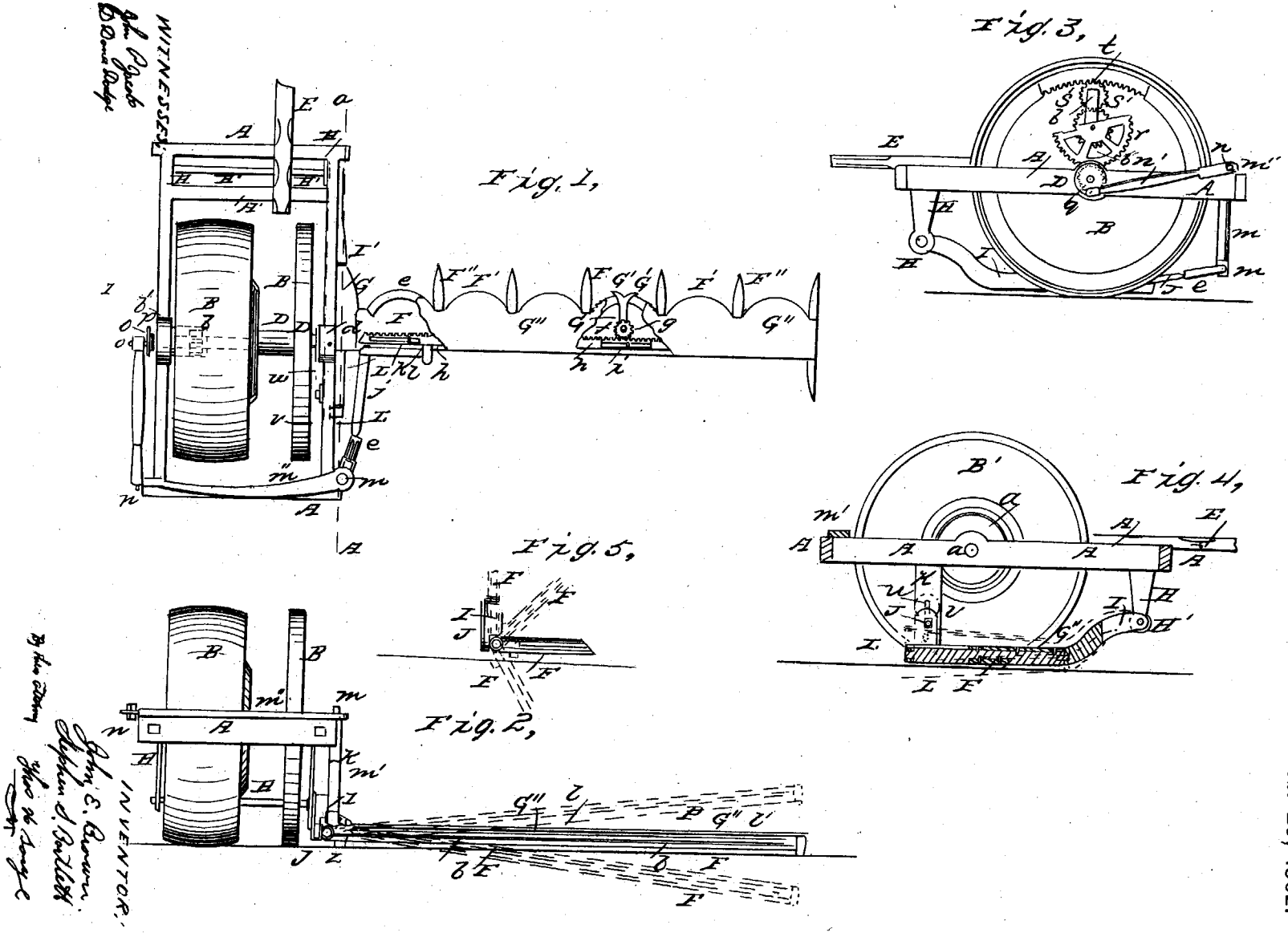
WITNESSES:
John P. Jacobs
D. Dana Dodge
INVENTOR:
John E. Brown.
Stephen S. Bartlett
By their Attorney Thos. H. Sawyer
N. PETERS, Photo-Lithographer, Washington, D. C.

UNITED STATES PATENT OFFICE.

JNO. E. BROWN, OF WOONSOCKET, AND STEPHEN S. BARTLETT, OF PROVIDENCE, RHODE ISLAND, AND THOMAS H. DODGE, OF WASHINGTON, D. C., ASSIGNEES OF SAID JNO. E. BROWN AND STEPHEN S. BARTLETT.

IMPROVEMENT IN GRAIN AND GRASS HARVESTERS.

Specification forming part of Letters Patent No. 12,121, dated January 2, 1855; Reissue No. 1,111, dated January 1, 1861; Reissue No. 1,282, dated February 25, 1862.

*To all whom it may concern:*

Be it known that we, JOHN E. BROWN, of Woonsocket, in the county of Providence and State of Rhode Island, and STEPHEN S. BARTLETT, formerly of said Woonsocket, but now residing in the city of Providence, in said county of Providence and State of Rhode Island, have invented certain new and useful Improvements in Grain and Grass Harvesters; and we do hereby declare that the following is a full, clear, and exact description of the same, reference being had to the accompanying drawings, forming a part of this specification, in which—

Figure 1 represents a plan view of a Brown and Bartlett mowing-machine embracing our said improvements. Fig. 2 represents a rear view of the same machine, with the finger-beam being shown in three different positions, as will be more fully described hereinafter. Fig. 3 represents a side view, looking in the direction of arrow 1, Fig. 1, some of the parts being represented broken away to show the position of the gearing more fully. Fig. 4 represents in black lines a longitudinal section on line A *a*, Fig. 1, and Fig. 5 represents a detached section of some of the parts to illustrate the flexible connection of the finger-beam with the main frame, as will be hereinafter more fully set forth.

In the accompanying drawings, A A A A represent the main frame of the machine, which is supported by two wheels, B B′—one at each side of the machine—and connected to a tubular shaft, D, which turns on a stationary axle, D′.

E represents a section of the tongue, to which the team is to be attached in any well-known and suitable manner. This tongue is attached to the front of the frame in a rigid manner, so that it supports and keeps the main frame A, on which the driver rides, from tipping down or up as it is drawn over the ground, while the wheels B B′ keep the said frame from tipping over laterally.

As the particular cutting device, together with the mechanism for operating the same, represented in the drawings has been described somewhat in detail in other patents of even date herewith, it is not deemed necessary to repeat such description here, as reference can be had to such description, and we shall therefore only describe so much of the machine represented in the annexed drawings as is necessary to illustrate the invention which forms the subject of this patent, and the nature of which consists, first, in the combination of a floating folding finger-bar with the frame of a grass-harvester, for purposes hereinafter to be stated; second, in the combination of a stop, with a floating folding finger-bar and the frame of a grass-harvester, for purposes hereinafter set forth.

In the accompanying drawings, F represents the finger-bar or cutter-stock, which supports the cutting apparatus, and which may be made in the form represented or in any other desirable form. The heel end of the finger-bar F is fastened in a recess in the under side of a rock-shaft or heel-piece L, whose front journal turns in a projection, I′, in the drag-bar I, while the rear journal of said rock-shaft turns in a box, L′, fastened to the rear of the drag-bar or coupling-piece I. The front elevated end of the drag-bar I is fastened to the inner end of a rock-shaft, H′, which is fitted to turn in proper bearings in the lower ends of two hangers, H H, fastened to and extending down from the front of the frame. To give said drag-bar greater strength to resist any sudden and unusual lateral strain when the machine is in operation, a guide-piece, J, is fastened to its inner rear side, so as to extend up some distance above the top thereof and so as to lap by another guide-piece, K, which is fastened to the frame of the machine and extends down and laps by the inner side of the guide-piece J. The lower end of the guide-piece K is provided with a long slot, *u*, in which plays a guide pin or stud, *v*, which projects from the guide-piece J. A nut or head, *w*, on the inner end of the stud or guide-pin *v* keeps the latter from leaving the slot, but allowing it free play up and down therein. The finger-bar thus connected is left free to rise and fall at the heel end by reason of the freedom with which the rear end of the drag-bar or coupling-piece I can vibrate up and down above the plane on which the main wheels may be resting, two such positions being shown in Fig. 4—one in red and the other in dotted lines. The outer end of the finger-bar is also free to rise and fall by reason of the freedom with which the rock-shaft L turns on its axis, as is illustrated in red and dotted lines, Fig. 2, of the accompanying drawings. A finger-bar thus connected to the machine is what we call a "floating finger-bar," since it is free to rise or fall at both ends or at either end, and that, too, without affecting the motion of the main frame or its supporting wheels, and is therefore capable of conforming to the irregularities in the surface of undulating ground, so that grass standing thereon can be cut close down to the ground and in a very uniform manner. Again, when occasion requires, the attendant can take hold of the outer end of the finger-bar and raise up the cutting apparatus to pass stumps, stones, or other similar obstructions. This operation is rendered less laborious by reason of the fact that the main weight of the finger-bar rests all of the time upon the ground, and over which the heel is drawn, and to the uneven surfaces thereof it is still free to conform by reason of the free vibration of the rear end of drag-bar I, to which it is connected. The finger-bar can also be raised and turned up or folded up at the side of the machine, and there fastened by a rope, so that the machine can be drawn on its own wheels, like a cart, from one field to another or over fields of cut grass and through gates or bars of ordinary width; and this is what we call a "floating folding finger-bar," since when resting on and drawn over the surface of the ground it is free to rise and fall and sway up and down, bodily or at either end, independent of the other end of the main frame, while, when occasion requires, it can be raised entirely from the ground and folded up at the side of the machine, and there fastened, without raising the frame or either of the main wheels. As there might be danger of the heel of a finger-bar thus free to rise and fall to drop into deep holes or gullies, especially if the other end happened to be raised by the attendant at the time, the slot in the guide-piece K does not extend quite to the bottom of said piece, so that the guide-pin *v* prevents the heel of the finger-bar from falling too low down when passing such places by resting on the bottom of said slot. The wide range of motion of which the finger-bar is capable, should it ever be necessary or desirable to place the finger-bar in such elevated or depressed position, is illustrated in red and dotted lines, Fig. 5. The operation of the cutting apparatus is not seriously effected by the swaying up and down of the finger-bar, nor does it prevent the finger-bar from being folded up at the side of the machine, since arm *j* is free to turn in the socket *l* when the outer end of the finger-bar rises or falls.

The various parts of the machine may be made in any desirable form, and it is manifest that our invention may be arranged to apply to other harvesting-machines.

Having described one practical mode of applying our said improvement to use, what we claim as our invention, and desire to secure under this patent, is—

1. The combination of a floating folding finger-bar with the frame of a grass-harvesting machine, whereby, when the machine is in operation, the cutting apparatus is left free to conform to the inequalities of the ground without affecting the motion of the main frame, and is also capable of being raised and turned or folded up so as to facilitate the passage of the machine from place to place or over fields of cut grass.

2. The arrangement of a floating folding finger-bar with the frame of a grass-harvesting machine in such a manner that the attendant can freely approach said finger-bar from the rear and turn up the outer end thereof with facility to pass stumps, stones, or through gates without tipping up or raising the carriage while the main weight of the finger-bar is allowed to rest on the ground at the side of the machine, for the purposes stated.

3. The combination, of a stop, *v*, or any equivalent device for the purpose stated, with the heel of a floating folding finger-bar and the frame of a grass-harvester.

In witness whereof we have hereunto subscribed our names.

JOHN E. BROWN.
STEPHEN S. BARTLETT.

Witnesses:
THOMAS STEEN,
ALBERT MOWRY.